3,093,498
MOLDED ALUMINA ARTICLES AND PROCESS OF MAKING THEM
Osgood J. Whittemore, Jr., Princeton, Alan G. King, Shrewsbury, and John C. Logan, Leicester, Mass., assignors to Norton Company, Worcester, Mass., a corporation of Massachusetts
No Drawing. Continuation of application Ser. No. 767,020, Oct. 13, 1958. This application June 1, 1961, Ser. No. 113,997
10 Claims. (Cl. 106—62)

The invention relates to molded alumina articles and process of making them.

This application is a continuation of our application S.N. 767,020 filed October 13, 1958, for Molded Alumina Articles and Process of Making Them, now abandoned.

One object of the invention is to provide hard, wear resistant, ceramic articles for all sorts of uses, such as tool bits for use in machine tools, for balls in ball bearings, for balls in check valves, for bearings of all kinds, for seals, for wire-drawing dies, and for wear resisting parts. Other objects are to make such articles out of non-strategic constituents out of readily available material and out of inexpensive material. Another object is to make articles of the nature indicated which have high resistance to wear. Another object is to make articles of the nature indicated which will withstand high temperatures. Another object is to make articles of the nature indicated which have high resistance to corrosion. Other objects are to provide articles of these kinds which are hard at high temperatures, have low affinity for metals, have low thermal conductivity, are non-conductors of electricity, are resistant to oxidation, have dimensional stability and have low coefficients of friction against cemented carbide, hard steel and the like.

Another object is to provide a practical process for the manufacture of such articles. Another object is to provide such process which will permit the manufacture of such articles with uniform properties and to enable the production of identical articles on a large scale. Another object is to provide a process of the nature indicated whereby deliberate variations therein will give forecastable variations in the articles as desired. Another object is to provide articles of high abrasion resistance, especially when refractoriness is important but also when it is not.

Other objects are to produce machine tool bits for machining various materials by use in lathes, milling machines and in other machine tools to give superior performance in the following respects: higher production rates than existing tools; better finishes; higher speed operation; machining difficultly-machinable metals; machining hard metals; higher temperature operation; operation without coolant; better maintenance of work dimensions; operation without welding of metal chips to tool; elimination of certain grinding operations on work; machining of abrasive materials and attaining longer tool life.

Other objects will be in part obvious or in part pointed out hereinafter.

Our process of making these articles involves hot pressing a powdered mixture of the ingredients at temperatures in the range of 1400° C. to 1800° C. and pressures to give density in the product from 3.95 up to approximately the maximum theoretical density which is taken to be 4.00 grams per cubic centimeter for substantially pure alumina.

Customarily the hot pressing process employs graphite molds to withstand the high furnace temperatures. At times the strength of these may permit pressures up to as much as 6000 p.s.i. (pounds per square inch) or sometimes even higher, but for many mold shapes the graphite breaks too frequently above 3500 p.s.i. pressures in the product. It is advantageous to use as high pressures as practical but the pressure should be at least 500 p.s.i. Molding furnaces are customarily electric resistance of induction powered, and are well known in the art.

Since high speed turning of steel with ceramic alumina tools probably represents the most difficult use requirement for judging the quality of highest grade molded alumina articles, it was used as the basis of judgment in the extensive research and development work associated with our invention. A "machinability lathe" of heavy and accurate construction made especially for quantitative studies of tool bit turning performance was used in this work. It is equipped with dynamometers to measure and continuously to record various force parameters on the tool known as feed load, radial load and tangential load.

The drive is continuously variable up to about 2,000 r.p.m. and power is available up to 25 rated horsepower, with some permissible overload in intermittent testing. High speed turning conditions and tool geometry that had previously been shown to be feasible for ceramic tools were selected, and were maintained constant through the test comparisons of the turning performance test.

U.S. Patents No. 2,538,959 to A. H. Ballard and No. 2,618,567 to G. E. Comstock are in the field of hot pressed alumina products and constitute useful tool bits. In fact, Comstock's product which has received wide acceptance as an outstanding alumina tool is used as a comparison material in our lathe turning tests as will be described farther on. Our new products, however, constitute great improvements over Ballard and Comstock, and we specify parameters to make products that are of unprecedented usefulness.

The conditions of the severe high-speed turning performance test for evaluating the alumina ceramic tools were established as follows:

Tool holder_____ Clamp type with adjustable chipbreaker.
Cutting speed_____ 1500 s.f.p.m. (surface feet per minute).
Feed_____ 0.011" per revolution.
Depth of cut_____ 0.100".
Work material_____ SAE 6150 annealed steel, in the "as purchased" condition. BHN = about 200. (BHN = Brinell hardness number). Solid cylinder 6" diameter by 20" long.

This gave a reasonably reliable accelerated test when the tools were supported in a rigid holder and the following tool geometry was used:

Side cutting edge angle.—This is the angle between a plane perpendicular to the axis of the work piece and the edge of the tool which is called the side cutting edge and which is nearest to parallel to this plane: 15°.

End cutting edge angle.—This is the angle between the vertical plane of the work pice axis and the edge of the tool which is called end cutting edge and which is nearest to parallel to this plane: 15°.

Side rake angle.—This is the angle between the end cutting edge and a horizontal plane: —5°. The negative sign means that the far end of the end cutting edge is above the nose.

Back rake angle.—This is the angle between the side cutting edge and a horizontal plane: —5°. The negative sign means that the far end of the side cutting edge is above the nose.

*Nose radius.*—This is the radius of the nose. .03125″.

*Cutting edge land angle.*—This is the dihedral angle between the surface called land behind a cutting edge and the side face of the tool bit below it. Both of these angles are 135°, called 45° for the acute angle. For further use of the tool bit each edge has a land back of it.

These conditions are based on much preliminary work, and are believed to represent as good comparative test conditions as the present state of the art permits. The cutting edge land is considered very important in amplifying the resistance to chipping and ironing out previous inconsistency of results.

The tool performance was based on total square inches area of stock removed up to an arbitrarily selected end point of 25% increase in feed-load except when tool failure occurred earlier. At the conclusion of each pass, the area of stock removed is calculated by multiplying the circumference corresponding to the finished diameter at the end of the pass by the axial length of the pass. The sum of these areas for all the passes to the end point of the test gives the square inches of metal turned in each test. This gives the same relative results as calculating the stock removed in cubic inches provided a constant depth of cut is used, which was the case. The feed-load was monitored with a recording dynamometer during cutting, allowing an easy method of determining the 25% increase. Lathe r.p.m. was adjusted for each pass to keep cutting speed constant at 1,500 s.f.p.m. (surface feet per minute).

It should be noted that the machining conditions chosen are far beyond the capabilities of metal lathe tools and considerably beyond those of cemented carbide tools. Carbide tools fail rapidly at speeds above 500 or 600 s.f.p.m., whereas our test speed was 1500 s.f.p.m. Our alumina tools are much more resistant to high temperatures because alumina is a much more refractory and more oxidation-resistant material than the metal bond (usually cobalt) in cemented carbides, and also than the carbide itself.

Performance data on our new tools are given in Table III. Data for density and average crystal size of the tools are also supplied. Table III gives reference data for similar tools prepared according to Comstock's patent.

These data show that, whereas Comstock's tools have an average performance of around 200 square inches of metal turned up to the end point of the test, our new compositions will turn over 1,000 square inches of metal in the same test, and many tests have given over 2,000 or more than ten times as much. When the average crystal size gets greater than about 7 microns, the performance appears to fall off somewhat, and about 10 microns is taken as a maximum upper limit. When the average crystal size is extremely fine, such as around ½ micron, the tools appear to become more brittle in the particular turning test employed as shown by a tendency to break under the operating conditions. However, for these tools considering the small magnitude of the feed-load increase compared to the sizable amount of metal turned at the test end point termination, it is apparent that these fine crystalline compositions have great utility in other applications and even in steel turning when the test conditions are less severe than those established in the test employed. The average crystal size, determined by optical microscopic or electron microscopic methods lies in the range from 7 microns or at most 10 microns, down to 1 micron or down to 0.5 micron, and constitutes a crystalline matrix comprising at least 80% of the article.

Wear resistance as established by lapping experiments under constant conditions demonstrate another parameter that shows the importance of controlling the crystal size of my product for different applications. Samples with ½ x ½ inch surface were lapped with kerosene lubrication against a cast iron plate charged with #600 grit silicon carbide abrasive. Wear was determined by weighing the samples before and after lapping for a definite period of time. Results were:

| Av. crystal size (microns): | Wear (milligrams) |
|---|---|
| 4 | 21 |
| 1 | 9 |
| ¾ | 5 |

Thus, within the range of these measurements under the wear conditions employed, finer crystals in our product were shown to accompany improved wear resistance.

The "brittleness" of our molded products, as illustrated in the examples, made with different parameters of time-temperature to give different crystal sizes, was determined by a drop test. The test was performed by dropping a ½ inch diameter hard steel ball bearing from a magnetic release mechanism and impacting the center of a disc 1.15 inch diameter by 0.120 inch thick. The disc had smooth true parallel surfaces produced by diamond grinding and was supported by an annular hard steel knife edge one inch in diameter. The test was run by dropping the ball from an initial height less than that required to fracture the sample. The height was increased in small increments (one inch) with two drops at each height until the specimen fractured. The kinetic energy of the ball from this final height was calculated and this value is shown against average crystal size in the following table of impact test results:

| Average crystal size (microns): | Energy of impact at fracture (ergs $\times 10^5$) |
|---|---|
| 1 | 2.83 |
| 1 | 3.05 |
| 1½ | 2.65 |
| 2 | 3.45 |
| 3 | 6.20 |
| 6 | 6.90 |
| 7 | 7.10 |
| 8 | 4.30 |

In the manufacture of our new alumina products, the alumina raw material and the batch mixture are of high purity with respect to uncontrolled impurities. Many of our alumina raw materials are 99+% $Al_2O_3$. Certain constituents, however, are believed to have little influence on the properties of our product provided the parameters of our invention are met, and for some uses may have a measure of advantage. Among these are certain oxides which form solid solutions with alpha alumina. One class of these are sesquioxides of elements whose atomic radii are close to that of aluminum, and which are stable at high temperatures. These form solid solutions with alpha $Al_2O_3$ crystals themselves. Some data are as follows:

| Element: | Ionic radius (A.) |
|---|---|
| Al | .57 |
| Ga | .62 |
| Cr | .65 |
| Ti | .70 |
| V | .75 |

Up to 2% $Cr_2O_3$, or even more, has little effect on the properties of alumina although some tests indicate slightly improved toughness. Likewise, titania as $Ti_2O_3$ imparts an amber tint to alumina in solid solution amounts up to 1½% or possibly more. For these and other reasons special allowance is made for solid solution oxides in our product in the broad concept of our invention. We do not exclude them in amounts up to about 2% provided the other parameters of our invention are met. Since they are all heavier elements than aluminum, the density of the solid solutions is likely to be above that of alumina, and might run up to as much as 4.05 for a 2% amount.

Impurities tending to increase crystal growth during firing are maintained very low, or are overcome by crystal growth inhibitors, of which magnesium oxide derived from various compounds of magnesium is one of the best. The presence of as little as 0.015% MgO in admixture with alumina can produce important effects. A good amount to control crystal growth and the bad effects of other normal impurities is 0.5%, but up to 1% may be used. For some aluminas 0.1% MgO is sufficient. For alumina of 99.5% $Al_2O_3$, or higher up to spectroscopic purity, all crystal growth additives may be eliminated.

Magnesia appears to act as a crystal growth inhibitor through the formation of spinel ($MgO \cdot Al_2O_3$) at the crystal boundaries. Its influence in amounts up to 1% to retard the rate of crystal growth and develop more equidimensional crystals is believed to be advantageous for the alumina tool bits of our invention.

Summarizing our broad concept, the product consists of at least 98+% by wt. $Al_2O_3$, and most of the products are at least 99+% by wt. $Al_2O_3$, these values being exclusive of magnesia which may be present up to 1% by wt. and exclusive of oxides of metals forming solid solutions with $Al_2O_3$ each of which may be present up to about 2%. In any event when the magnesia and solid solution impurities are not excluded, the product should be at least 95% $Al_2O_3$. When the small impurity content of final products such as tool bits made with what we have called spectroscopically pure materials, is expressed in terms of analytically determinable impurities by gravimetric and spectroscopic methods, allowance must be made for the difficulties of exact analytical work even by experts in this field of analysis, and for uncertainties inherent in such analytical methods. Therefore, according to the best mode of our invention for rigorous requirements, such as steel turning tools, with the exception of magnesia and of solid solution oxides as mentioned above, the product contains impurities constituting no more than 0.12% by weight as determined analytically by quantitative gravimetric and spectrographic analyses.

We have made products of pure alumina that illustrate the importance of time-temperature firing conditions on crystal development. Fine powdered alpha alumina of about 0.2 micron average particle size of nearly spectroscopic purity was hot pressed to form discs approximately 1" diam. x ¼" thick. Results were as follows:

TABLE I

| Experiment No. | Soak Temp. (°C.) | Soak Time (Min.) | Density of Product | Crystal Description (microns) Av. of Ground Mass | Large Sizes |
|---|---|---|---|---|---|
| 1 | 1,700 | 1 | 4.00 | 10 | Prevalent size is 25 x 95. Some up to 180 long. |
| 2 | 1,605 | 4 | 3.98 | 2 | Some up to 30 long. |
| 3 | 1,450 | 20½ | 4.00 | 2 | Fairly uniform. |
| 4 | 1,425 | 51 | 3.90 | 2 | A few up to 10 x 30 microns. |

At 1700° C., with the slow firing cycle actually used, even a negligible soaking period was too great to produce fine crystals, but the product was consolidated to a high density and if the rise from the start of crystal growth and the drop to the end of crystal growth were more rapid, satisfactorily small crystals would be produced even at higher temperatures, so long as the Cm value were within the limits hereinafter given. At lower temperatures longer times under pressure are required to achieve high density, but finer crystals result in the ground mass or matrix material. However, some considerably larger rectangular crystals continue to be present. These larger crystals cause difficulty in producing a satisfactory average crystal size for the whole product, and in Table I the crystal size is given as one average value for the ground mass or background matrix of finer crystals, with additional qualification to cover relative amount and description of larger crystals. According to the invention, the crystals of the matrix should be from 2 to 7 microns in average size, any crystals more than 7 microns in average size being present to the extent of no more than 20% of the mass, with substantially no crystals having any dimension of more than 50 microns. The average size is the same measurement referred to as average diameter and has been discussed in some detail in these specifications.

The following products demonstrate further inhibition of crystal growth in our invention. We took powdered $NH_4Cl \cdot MgCl_2 \cdot 6H_2O$ as one source of MgO and dissolved it in a measured amount of distilled water. A different measured amount of this was added to weighed amounts of gamma alumina of around 0.02 micron average particle size and of nearly spectroscopic purity, to form a thick homogeneous slurry. This was then dried in an oven 24 hours, the soft cake broken down in a mortar and the product was hot-pressed at 4000 p.s.i., to form a disc approximately 2" diam. x ⅜" thick at 1750° C. with 9 min. soak. Results were as follows:

TABLE II

| Sample No. | Ammonium Magnesium Chloride per 100 gm. Alumina, gm. | Equivalent MgO, percent | Av. Cryst. Size Found in Micro. Exam., microns | Density (gm./cc.) |
|---|---|---|---|---|
| D | .952 | .15 | 5 | 3.99 |
| E | .191 | .03 | 8 | 4.00 |
| F | .095 | .015 | 14 | 3.99 |

The grain sizing of the raw alumina used must be fine and cooperate with the time and the temperature of firing to give the desired micron size of crystals in the product. Further manufacturing details will be given by illustrative examples later on in this discussion.

In general, soda and other alkalis are deleterious ingredients and should be maintained at low figures. Alkali metal oxide should not be over 0.1%. For most severe services $Na_2O$ less than 0.02% is desirable.

Alumina raw materials for the practice of our invention must be finely divided and of an average particle size no greater than and preferably less than the particle size of the crystals desired in our product. By particle size we mean ultimate particle size and not aggregated particle size which may be far larger. For raw material we may start with alpha, gamma-type or other crystallographic form of alumina. We normally start with material that is of fineness through 325 mesh screen, although sometimes aggregated particles are employed in which the ultimate crystal size is considerably finer than the particle size and in this case the initial sizing may be greater. The material is usually reduced by wet ball-milling to a particle size finer than 325 mesh, with ultimate crystal size smaller than that desired for the molded product.

Added ingredients such as magnesium oxide, fluoride, carbonate, chloride, acetate, are blended into the alumina by wet ball-milling.

After adequate mixing and size reduction has been obtained, the slurry is dried to an easily friable cake, broken up by hand and loaded into a pressing mold which may be of graphite for use in the final hot-pressing or may be of steel, and such procedure is often advantageous for cases in which an organic temporary binder such as Methocel or wax in solution is blended into the cake. In the latter case after prepressing, the product is fired to a low temperature such as 900° C. to 1300° C. to eliminate the binder and preliminarily to consolidate the piece, which is then loaded into the graphite mold for the final hot-pressing.

Typical raw materials for the practice of our invention are:

(A) Alumina powder produced by heating high purity aluminum sulfate or high purity ammonium aluminum sulfate at elevated temperates such as 700° to 900° C.

in air followed by hydrogen to aid in decomposing and purifying it to $Al_2O_3$.

(B) Alumina powder produced from pure aluminum metal such as by dissolving it in acid followed by calcination or by first precipitating the acid extract with ammonia, filtering, drying and then calcining it to decomposing temperatures such as even up to 1200° C. or more and then utilizing the alumina powder after breaking up the sintered cake, if necessary.

(C) Alumina powder from high purity aluminum isopropylate or other alcoholates, usually by hydrolyzing and then decomposing to $Al_2O_3$ by heating. Aluminum isopropylate melts at 118° C. However, it can be decomposed without melting by exposure to moisture forming hydrate of alumina and isopropyl alcohol which latter can be driven off by heating. The hydrate of alumina is decomposed by heating to different temperatures depending upon the desired crystallographic form and the degree desired for physical densification of the particles.

For best results with alumina tools the purity of the alumina appears to be of great importance. Magnesia specifically added to control crystal development characteristics is a helpful addition, but too much should be avoided. The magnesia is thought to form magnesium aluminate spinel at the crystal boundaries and this is believed to act as a deterrent to crystal growth. It also appears to aid in the development of equidimensional alumina crystals. In its absence, more elongated forms develop and may be less advantageous.

The aluminas employed as raw material were studied for purity. The supplier of the 99.9+% Al metal used in the preparation of the alumina for the tool of Example IV gave a certified inspection report of the aluminum lot supplied which he referred to as 99.99% Al material. This was Cu 0.002%; Fe 0.002%; Si 0.002%; Mg 0.002%; others 0.000%. These constitute only trace amounts and the material is considered to be of spectroscopic purity.

TABLE III

*Dynamometer Lathe Tests of Alumina Tools*

| Test No. | Ex. No. | Tool Description | | | | Turning Data at End of Test | | |
|---|---|---|---|---|---|---|---|---|
| | | Soaking Temp., °C. | Time of Soak (Min.) | Density (gm./cc.) | Ave. Crystal Size by Routine Method (Microns) | Reason for Ending Test [1] | Feed-Load Increase, percent [1] | Metal Turned, Sq. Ins. |
| 1 | | 1,750 | 9 | 3.98 | 8 | D.I. | 25 | 773 |
| 2 | | 1,750 | 9 | 3.98 | 8 | D.I. | 24 | 970 |
| 3 | | 1,750 | 9 | 3.98 | 8 | D.I. | 25 | 1,005 |
| 4 | | 1,750 | 7 | 4.00 | 6 | D.I. | 25 | 1,721 |
| 5 | IV | 1,650 | 4 | 4.00 | 6 | D.I. | 25 | 1,289 |
| 6 | | 1,750 | 12 | 3.98 | 5 | D.I. | 26 | 2,064 |
| 7 | | 1,750 | 12 | 3.98 | 5 | D.I. | 24 | 1,732 |
| 8 | VII | 1,750 | 7 | 3.99 | 5 | D.I. | 25 | 1,575 |
| 9 | | 1,750 | 9 | 3.99 | 5 | D.I. | 25 | 1,528 |
| 10 | | 1,750 | 9 | 3.99 | 5 | D.I. | 25 | 1,485 |
| 11 | | 1,700 | 3½ | 3.99 | 4 | D.I. | 25 | 2,344 |
| 12 | | 1,700 | 9 | 3.99 | 4 | D.I. | 25 | 1,963 |
| 13 | | 1,700 | 0 | 3.99 | 4 | D.I. | 25 | 2,781 |
| 14 | | 1,700 | 0 | 3.99 | 4 | D.I. | 23 | 2,168 |
| 15 | III | 1,700 | 9 | 3.99 | 3½ | D.I. | 28 | 1,682 |
| 16 | III | 1,700 | 9 | 3.99 | 3½ | D.I. | 25 | 1,663 |
| 17 | II | 1,500 | 23 | 3.99 | 3 | D.I. | 25 | 3,251 |
| 18 | I | 1,700 | 2 | 3.99 | 2 to 3 | D.I. | 31 | 2,443 |
| 19 | I | 1,700 | 2 | 3.99 | 2 to 3 | D.I. | 27 | 2,557 |
| 20 | VI | 1,450 | 22 | 4.00 | 2 | D.I. | 25 | 2,696 |
| 21 | | 1,600 | 4½ | 3.99 | 2 | Tip Fracture | 5 | 1,883 |
| 22 | | 1,690 | 0 | 3.99 | 2 | Excessive Vibration. | 4 | 1,685 |
| 23 | | 1,690 | 0 | 3.99 | 2 | Tool Broke on Entry. | 8 | 2,001 |
| 24 | V | 1,685 | 1½ | 3.97 | 1½ | D.I. | 25 | 1,517 |
| 25 | V | 1,685 | 1½ | 3.97 | 1½ | D.I. | 27 | 1,589 |
| 26 | | 1,600 | 0 | 3.98 | .5 to 1 | Top Flake | 13 | 1,729 |
| 27 | | 1,600 | 0 | 3.98 | | Tip Fracture | 3 | 366 |
| 28 | | 1,600 | 0 | 3.98 | | Nose Chip | 12 | 402 |
| 29 | | 1,500 | 11½ | 3.98 | | Top Flake | 21 | 1,786 |
| 30 | | 1,500 | 5 | 3.98 | | Nose Chip | 16 | 2,720 |

| Test No. | Reference Description | Tool Description | | | Turning Data at End of Test | | |
|---|---|---|---|---|---|---|---|
| | | Density (gm./cc.) | Av. Crystal Size by Routine Method (Microns) | | Reason for Ending Test [1] | Feed-Load Increase, percent [1] | Metal Turned Sq. In. |
| 31 | Comstock U.S. Pat. 2,618,567 | 3.98–4.00 | About 10–15 | | D.I. | 25 | 115 |
| 32 | do | 3.98–4.00 | About 10–15 | | D.I. | 25 | 224 |
| 33 | do | 3.98–4.00 | About 10–15 | | D.I. | 25 | 112 |
| 34 | do | 3.98–4.00 | About 10–15 | | D.I. | 25 | 127 |
| 35 | do | 3.98–4.00 | About 10–15 | | D.I. | 25 | 139 |
| 36 | do | 3.98–4.00 | About 10–15 | | D.I. | 25 | 151 |
| 37 | do | 3.98–4.00 | About 10–15 | | D.I. | 25 | 122 |
| 38 | do | 3.98–4.00 | About 10–15 | | D.I. | 25 | 161 |
| 39 | do | 3.98–4.00 | About 10–15 | | D.I. | 25 | 180 |
| 40 | do | 3.98–4.00 | About 10–15 | | D.I. | 25 | 575 |
| 41 | do | 3.98–4.00 | About 10–15 | | D.I. | 25 | 418 |
| 42 | do | 3.98–4.00 | About 10–15 | | D.I. | 25 | 207 |
| Average | | | | | | | 212 |

[1] Feed-load percent increase at the end point of test was intended to be 25%. When the reason for ending the test is "D.I.," which stands for dynamometer indication, figures other than 25% were due to operator error in stopping the test at what he thought was 25% but was not; a later study of the chart recordings gave corrected values. All of the feed-load increase values given in the table are corrected values.

Spectrograms made in our laboratory of alumina produced from ammonium aluminum sulfate and from aluminum isopropylate showed the presence of only traces of elements other than aluminum. The intensity of the lines for other elements was even less than those from a sample of the 99.9% aluminum. It is therefore concluded that these aluminas also were of spectroscopic purity.

EXAMPLE I

In this example we used alumina produced by the calcination of ammonium aluminum sulfate as the starting material. The calcination was at high temperature and therefore the alumina was alpha alumina. Calcining conditions were: (1) in air 3 hour soak at 1000° C., (2) in hydrogen 1 hour soak at 800° C., and (3) in air 5 hour soak at 1200° C. The alumina powder was of very fine particle size averaging 0.2 to 0.3 micron diameter.

We took 250 grams of this alumina, added 2.6 grams of C.P. magnesium carbonate, $MgCO_3$, 1200 cc. water, and put the mixture in a one-gallon size porcelain mill with 1" diameter alumina milling balls. After ½ hour milling, the mixture was poured into a porcelain lined container, occupying a depth of about an inch, dried at about 76° C. for 24 hours, then the soft cake was broken up by hand in a porcelain mortar with a pestle. The particles were approximately minus 325 in sizing.

A graphite mold band 2" I.D. x about 7" O.D. x 11½" high, with well-fitting graphite plungers, was used. Two discs, with a graphite separator about ⅜" thick, were molded at the same time. The material for each disc consisted of 66 grams which is sufficient to mold final discs about 5/16" thick. The mold was put inside a furnace with graphite sleeve susceptor, which was surrounded by a water-cooled copper induction coil, in a hydraulic press of 75 tons capacity. The electrical frequency was 3,000 cycles per second and the machine was of 100 kw. rating. The assembly was tuned to efficient operation. In this example, appreciable rate of crystal growth started at about 1400° C. The firing schedule from 1400° C. to 1700° C. was twelve minutes, four minutes at the soaking temperature of 1700° C. and twelve minutes back to 1400° C.

After cooling to room temperature, stripping the mold, and cleaning the sides of the discs with an Alundum (fused aluminum oxide) grain sandblasting operation, the discs were found to have a density of 3.99 grams/cc. The average crystal size by microscopic examination was approximately 2 to 3 microns.

Tool bits of size ½" x ½" x ¼" were cut from the discs and ground accurately and carefully, using diamond wheels. The geometry and testing were as previously given. Results are found as tests #18 and #19 in Table III. The performance was excellent as shown by the metal turned figures of about 2500 sq. in. at the end point of the test by wear of the tool. This is over ten times the average performance value for Comstock's tool in the same test as given at the bottom of the table, and Comstock's tool is a good tool as evidenced by extensive field testing and actual commercial use.

EXAMPLE II

The material and procedure in this case was the same as in Example I except that the firing schedule for the discs was different. In this example, appreciable rate of crystal growth started at about 1400° C., it took four minutes to raise the temperature to 1500° C. the temperature of soak which was maintained for twenty-three minutes then six minutes to drop to 1400° C. again. The discs were 3.99 grams/cc. density and about 3 microns average crystal size. This product was therefore the same as that of Example I, but was produced by a longer soak at lower temperature.

The turning test on an Example II bit is given as Test #17 in Table III and is seen to be very satisfactory at 3251 sq. in. of metal removed.

EXAMPLE III

The starting alumina was spectroscopically pure gamma type alumina made by low temperature calcination of ammonium aluminum sulfate and having particle size less than 1 micron.

The mixing, milling, drying and breaking up of the cake, starting with the $MgCO_3$ addition, was the same as Example I except that the batch was larger, being 1000 grams of $Al_2O_3$, 10.1 grams of $MgCO_3$, 400 cc. water in a 2 gallon porcelain mill.

An amount of 100 grams of the powdered mixture was taken and was mixed with 10 cc. of a 1% water solution of Methocel 400 c.p.s. and 40 cc. additional water was added. This small moist granular mixing was made in a porcelain dish by hand with a stainless steel spoon. It was put into a 2⅛" diameter steel mold and pressed at about 2½ tons per square inch. After removal from the mold, the product was dried 24 hours at 76° C., then crushed in a porcelain mortar and pestle to approximate sizing minus 16. An amount of 75 grams of this powder was repressed in the same mold under the same conditions to form a disc which was then transferred to a 2.130" diameter graphite mold for the hot pressing which was at 8¾ tons on the plungers. In this example, appreciable rate of crystal growth started at 1400° C. In the firing cycle it took twelve minutes to reach the temperature of soaking, 1700° C., which was held for nine minutes, and then twelve minutes for the drop back to 1400° C. After cleaning the disc, the density was found to be 3.99 grams/cc. Crystal size was 3 to 4 microns. One ½" square x ¼" thick tool cut from the disc was tested at two different widely separated times and gave 1682 and 1663 square inches of metal removal as shown in Table III items 15 and 16.

EXAMPLE IV

Aluminum metal of 99.9+% Al purity was obtained in small ingot form. Two ingots (about ½ pound total) of this were dissolved in hydrochloric acid, about 10 days being required. Then magnesium acetate solution was added in amount calculated to give 0.5% MgO on the $Al_2O_3$ content of the dissolved metal. The aluminum content of the solution was then precipitated as hydroxide with an excess of $NH_4OH$ and the magnesium as carbonate with $(NH_4)_2CO_3$. The precipitate was filtered and dried. It was then heated in a small electric furnace for 4 hours up to 250° C. and then 18 hours at 400° C., to dehydrate the alumina. Final heating was 5 hours soak at 1200° C., to drive off other impurities and densify the alumina particles, converting them to the alpha crystalline form. The product consisted of lightly sintered lumps.

The lumps were crushed by hand in a porcelain mortar to about minus 8 sizing and then wet milled for 7 hours in a porcelain mill with alumina balls. After drying, the soft cake was broken up by hand in a porcelain mortar with a pestle. The particles were approximately minus 325 in sizing. Two 2" diameter discs were molded as in Example I. In this example, appreciable rate of crystal growth started at about 1400° C. There was a ten minute rising to 1650° C. a four minute soak, and a ten minute drop back to 1400° C. again. After cleaning, the discs had a density of 4.00 grams/cc. and 6 micron average crystal size. A tool cut from one of these discs give 1289 sq. in. of metal turned, as given in item 5 of Table III. This is a great improvement over Comstock's tool.

EXAMPLE V

The alumina in this example was prepared from high purity aluminum isopropylate which was crushed to about ¼" size pieces in a porcelain mortar and hydrolyzed with an excess of water by passing saturated steam through the slurry for a number of hours until the odor of alcohol no longer was perceptible. The gelatinous mass was then filtered through a Buchner funnel, and the cake dried at about 110° C. and crushed in a mortar to about 16 mesh particles.

This alumina was calcined at 1000° C. to drive off residual water. After this, magnesium carbonate in amount of 1.% of the alumina was added together with water. Since the batch was a small one, it was milled in a one quart porcelain mill with alumina pebbles for 9 hours until fine enough to pass a 325 mesh screen. Then it was dried and the soft cake broken up.

Discs 2" diameter of this material were cold pressed in a graphite mold that happened to be available, and were transferred directly to the graphite mold used in the hot molding furnace. Molding was at 5000 p.s.i. In this example appreciable rate of crystal growth started at 1400° C. In the firing cycle there was a twelve minute rise to 1685° C. and a one and one-half minute soak at this temperature followed by a thirteen minute drop back to 1400° C. again.

The product was cleaned and had a density of 3.97 with average crystal size estimated at 1 to 2 microns. Two tools were tested and gave 1517 and 1589 square inches of material removed. However, the second tool was run to only 17% feed-load increase by error and would have given still better performance if the test had been carried out to the correct objective of 25% feed load increase. Data are in Table III items 24 and 25.

EXAMPLE VI

The alumina was fine powder alpha alumina of spectroscopic purity, being the same type as for Example I, having crystal size 0.2 to 0.3 micron, but no additive was used. The alumina was hot molded directly as a disc 1" diameter x 5/16" thick at 6000 p.s.i. In this example appreciable rate of crystal growth started at 1300° C. There was a two minute rise to 1450° C. at which temperature the disc was soaked for twenty-two minutes, then the temperature was dropped back to 1300° C. in seven minutes. After cleaning, the density of the disc was found to be 4.00 gm./cc. and average crystal size 2 microns. Tools cut from it were tested and gave an excellent figure of 2696 square inches of metal removed as given in item 20 of Table III.

EXAMPLE VII

The alumina and the mixture for this example were the same type as for Example I. The milled powder was charged directly in the mold and hot pressed at 4000 p.s.i. to produce a 2" x 5/16" thick disc. In this example appreciable rate of crystal growth started at 1400° C. There was an eighteen minute rise to 1750° C. followed by a seven minute soak at this temperature followed by a fourteen minute drop back to 1500° C. The density was 3.99 and average crystal size was 5 microns. In the turning test, 1575 square inches of metal were removed as shown in item 8 of Table III. This is excellent performance.

EXAMPLE VIII

The material and the mixture for this example were the same as for Example VII. To the milled mixture was added wax temporary binder and preforms were made 0.28" diameter. These were cold pressed at 4 tons/sq. in. and then the temporary binder burned out at 1200° C., 3 hours soak. The cylinders were then hot pressed at 5000 p.s.i. In this example appreciable rate of crystal growth started at 1400° C. There was a ten minute rise to 1700° C. the temperature of soak for two and one-half minutes, and a ten minute drop back to 1400° C. This produced products 0.28" diameter x 0.14" height to be later pierced for use as experimental wire-drawing dies. For these small pieces the density was 3.98 gm./cc. with average crystal size 3 microns.

Thus it is seen that:

(A) Increasing the soaking time increases crystal size and allows more penetration of heat into the interior of large or multiple molds; it also aids in increasing density.

(B) Increasing the pressure aids in densification.

(C) Increasing the temperature increases the rate of crystal growth and is the main factor towards densification. The density and crystal size of resultant products are listed in Table III for different combinations of these three parameters.

Etched polished surfaces at 1000× magnification of the tool bit of this invention compared to the Comstock tool bit of the prior art show the smaller crystal size of the new product. Also, the relatively equidimensional character of the crystals can be seen.

Wear land electron micrographs show striking differences that are associated with tool performance. The wear on the new tools is much more of a generalized phenomenon showing striations and flow lines without much relation to the alumina crystals, whereas the old tools disclose that the roughness is markedly related to the crystallographic characteristics.

We have given many examples of molded alumina articles and how we make them according to our invention. It is difficult to select "the best mode." For some requirements one example may be the best, for other requirements another example may be the best. Frequently two examples will have characteristics for some uses generally superior but so close to each other that it will be nearly impossible to choose between them. For use as tool bits, for example, one bit may give better performance machining one kind of steel under specific conditions, another better performance machining another kind of steel under the same or under other conditions. However, we have the most data on the article of Example VII and have micrographs thereof. Therefore, to comply with the statute, we select Example VII as "the best mode."

It will thus be seen that there has been provided by this invention molded alumina articles and process of making them in accordance with which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

We claim:

1. Process of producing hard wear resistant articles comprising providing comminuted alumina which is at least 98% alumina and consists of alumina and up to about 2.0% oxides which form solid solutions with alumina selected from the group consisting of the oxides of gallium, chromium, titanium, vanadium and mixtures thereof, at least 99.88%, molding said alumina, then pressing said alumina under a pressure of at least 500 pounds per square inch at a temperature between about 1400 and 1800° C. and for a time effective to form the alumina with a density between 3.95 and 4.05 grams per cubic centimeter and at least 80% as a crystalline matrix with average crystal size of from one-half micron to ten microns.

2. Process of producing hard wear resistant articles comprising providing comminuted alumina mixed with material yielding by the process from .1% to 1% of magnesia in the articles said alumina being at least 98% pure alumina and consisting of at least 99.88% alumina and up to about 2.0% oxides which form solid solutions with alumina selected from the group consisting of the oxides of gallium, chromium, titanium, vanadium and mixtures thereof, molding said alumina, then pressing said alumina under a pressure of at least 500 pounds per square inch at a temperature between about 1400 and 1800° C. and for a time effective to form the alumina with a density between 3.95 and 4.05 grams per cubic centimeter and at least 80% as a crystalline matrix with average crystal size of from one-half micron to ten microns.

3. A hot pressed molded alumina article, for use for example as a tool bit for the machining of metal, having a composition, by weight at least 98% alumina, up to about 2.0% oxide selected from the group consisting of the oxides of gallium, chromium, titanium, vanadium and mixtures thereof at least 98.88%, including permissible magnesia at least 99.88%, with a density between 3.97 and 4 grams per cubic centimeter, characterized by the fact that at least 80% is a crystalline matrix with average crystal size of from one-half micron to ten microns.

4. Article according to claim 3 having from .1% to 1% of magnesia.

5. Article according to claim 4 in which the average crystal size of the matrix is in the range from about 1 to about 7 microns.

6. Article according to claim 3 in which the average crystal size of the matrix is in the range from about 1 to about 7 microns.

7. Raw batch for the manufacture of hot molded dense articles of alumina containing at least 98% $Al_2O_3$, oxide selected from the group consisting of the oxides of gallium, chromium, titanium, vanadium and mixtures thereof at least 98.88%, including permissible magnesia at least 99.88%, having a particle size of less than 44 microns and a crystal size of less than 10 microns.

8. Raw batch according to claim 7 in which the crystal size is below 1 micron.

9. Raw batch according to claim 8 having magnesia producing compound yielding when fired from .1% to 1% magnesia.

10. Raw batch according to claim 7 having magnesia producing compound yielding when fired from .1% to 1% of magnesia.

References Cited in the file of this patent

UNITED STATES PATENTS

| | | |
|---|---|---|
| 2,502,198 | Benner et al. | Mar. 28, 1950 |
| 2,538,959 | Ballard | Jan. 23, 1951 |
| 2,618,567 | Comstock | Nov. 18, 1952 |
| 2,630,617 | Robinson | Mar. 10, 1953 |
| 2,810,182 | Brandes | Oct. 22, 1957 |
| 2,947,056 | Csordas et al. | Aug. 2, 1960 |